Patented May 21, 1929.

1,714,445

UNITED STATES PATENT OFFICE.

WILHELM REUSS, OF MANNHEIM, GERMANY.

SOLDERING AND WELDING MEDIUM FOR ALUMINUM.

No Drawing. Application filed June 23, 1928, Serial No. 287,886, and in Germany February 15, 1928.

This invention relates to a heretofore proposed soldering or welding medium having for its object the production of a perfectly smooth and even joint free from protuberant foreign substances, such medium, either in fluid or granular form, consisting of equal parts of borax, boracic acid, and caustic potash.

In order to effect a perfect joint by the use of the medium above referred to, it is necessary to continually agitate the flowing substance on the surfaces to which it is applied, during the act of making a joint, especially when sheets of thin metal are being united, thus breaking and destroying a film of oxide which forms on the surface.

The object of this invention is to provide a soldering or welding medium whereby the necessity of agitating the flowing substance, during the process of soldering or welding, is obviated, the medium, itself eliminating the oxide film and increasing the capability of the substance to flow freely and evenly, thereby producing a perfectly smooth, silver-like and shining surface, the hitherto difficult process of welding aluminum and aluminum with alloys, even when in the form of thin sheets, being rendered easy.

According to this invention, a medium for soldering or welding, consisting of equal parts of borax, boracic acid and caustic potash, either in granular or liquid form, has added to it a suitable quantity of salts or mineral acids, an addition of common salt and sulphuric acid having been found to be particularly efficacious.

As indicated above, salts, other than common salt can be used such as, for instance, sulphurous or nitreous potassium or chloride of ammonia.

A useful example consists of 100 grains of a mixture of 10 grains of borax, 10 grains of boracic acid, and 10 grains of caustic potash, dissolved in 7 cubic centimetres of water, to which is added 15 grains of common salt and 1 grain of sulphuric acid of 66° Bé. dissolved in 9 cubic centimetres of water.

What I claim and desire to secure by Letters Patent of the United States is:—

A soldering or welding medium comprising a mixture of 10 parts of borax, 10 parts of boracic acid, and 10 parts of caustic potash, dissolved in water, with an addition of 15 parts of common salt and 1 part of sulphuric acid of 66° Bé. dissolved in water.

WILHELM REUSS.